Patented Oct. 24, 1950

2,526,639

UNITED STATES PATENT OFFICE 2,526,639

POLYMERIC MATERIALS FROM FORMALDEHYDE AND A HYDROGENATED BUTADIENE-1,3-ACRYLONITRILE COPOLYMER

Martin E. Cupery, Wilmington, Del., assignor to E. I. du Pont de Nemours & Company, Wilmington, Del., a corporation of Delaware No Drawing. Application August 1, 1949, Serial No. 108,042

3 Claims. (Cl. 260—72)

This invention relates to polymeric materials and more particularly to certain new amine/aldehyde resins.

The amine/aldehyde resins heretofore known are derived chiefly from aromatic or heterocyclic amines such as aniline or melamine. Their industrial uses are somewhat limited and they are in general characterized by difficulties in preparation, handling and application.

This invention has as an object a new class of amine/aldehyde resins which are adapted to a wider variety of technical applications than the previously known resins referred to above. A further object is an amine/aldehyde resin which is stable in aqueous media and which is readily obtainable from cheap reactants. A further object is a method for obtaining these new amine/aldehyde resins.

The amine/aldehyde resins described herein are the condensation products of formaldehyde with polymeric primary amines which are the hydrogenation products of copolymers of 1,3-butadiene with acrylonitrile or methacrylonitrile, said copolymers containing from about 67% to about 84% of combined butadiene by weight.

The production of these polymeric amines, which are reacted with formaldehyde in accordance with the present invention, is described in application Ser. No. 108,043, filed on even date herewith by P. S. Pinkney. These polymeric amines are linear polymers characterized by a plurality of units of the formula

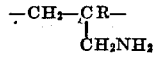

wherein R is hydrogen or methyl, these units being interspersed with completely or partially reduced butadiene units, and frequently also with some unreduced or partially reduced acrylonitrile or methacrylonitrile units. Their molecular weight is in general above 500 and preferably above 1000. It may be as high as 100,000 or even more, although the most useful polymers have molecular weights between 1000 and 10,000. These amino polymers vary from viscous liquids to resinous solids. They are characterized by solubility in dilute aqueous acids, as exemplified by acetic acid of 0.1–10% concentration. The polymeric amines contain between about 1.5 and 8.5%, preferably between 3 and 6%, of nitrogen in the form of primary amino nitrogen. Their total nitrogen content is usually somewhat higher since, as already mentioned, the hydrogenation of the cyano groups in the starting polymer is often incomplete. Depending on the starting material and the hydrogenation conditions, the proportion of cyano groups reduced to aminomethyl groups may vary from 25% to 95%.

The amino resins described above react with formaldehyde to give condensation products having a variety of uses, e. g., in wool shrinkproofing, paper treatment, waterproofing of cotton and other textile materials, water-base paint formulations, glass enameling compositions, etc. The amino resin/formaldehyde reaction products may be partial condensation products, in which case the formaldehyde is presumably present chiefly as methylol groups attached to the amino nitrogen atoms, or they may be completely condensed products wherein polymeric chains are presumably crosslinked through methylene groups. The partial condensation products are soluble in dilute aqueous acids. On evaporation of the solution and drying of the residual resin, for example at temperatures above 20° C. and more rapidly at temperatures above 80° C., condensation proceeds further and results in a resin which is insoluble in dilute aqueous acids or organic solvents. The same result may be achieved in other ways, for example by exposing the polymeric primary amine (as such, e. g., deposited from an organic solvent solution, or as salt, e. g., deposited from an aqueous acidic solution) to the action of formaldehyde vapors.

The amino resin/formaldehyde reaction products of this invention are most conveniently handled in aqueous acidic solution, and such solutions represent a preferred embodiment of the invention. Since strong acids are corrosive and may be injurious in many applications, the preferred acids are those having a dissociation constant below about $5 \times 10^{-2}$, such as formic, acetic, propionic, glycollic, butyric, phosphoric, boric acid and the like, although stronger acids may be used with proper precautions. The preferred acids are the volatile monocarboxylic acids, boiling below about 200° C., particularly acetic acid. The aqueous acidic solution need contain only as much acid as is necessary to dissolve the amino polymer, which is generally between 0.2 and 10% acid depending upon the type and quantity of polymer used. The polymeric amine itself is desirably present in amount between 0.1 and 25% by weight, although more concentrated solutions can be used. Instead of mixing acid and polyamine separately, it is possible to use preformed salts of the polyamines, which are dissolved in water to the desired concentration.

The aqueous acidic solution of polymeric amine is then treated with formaldehyde or a formaldehyde donor such as paraformaldehyde or trioxan. The amount of formaldehyde to be used relative to the polymeric amine is not usually critical but it is in general desirable to use at least 0.2 mole of formaldehyde (as anhydrous $CH_2O$ per primary amino group. Depending on the extent of amination of the polymer, this corresponds to a minimum amount of formaldehyde between about 0.5% and 3.5%, based on the weight of the polymeric amine. Much larger quantities may often be used if desired, up to 100 or 200% of the weight of the polymeric amine. In some cases, however, e. g., when foreign materials such as pigments are present, it is desirable to use formaldehyde in quantities not exceeding one mole per amino group since larger quantities may cause partial precipitation of the condensation product.

The partly condensed amine/formaldehyde reaction products of this invention are also soluble in many organic solvents, including aromatic hydrocarbons (benzene, toluene, the xylenes, etc.), a acyclic or cyclic ethers (e. g., dibutyl ether, dioxan, tetrahydrofuran), ketones (e. g., methyl ethyl ketone, cyclohexanone) and the like. These organic solvent solutions are in general less stable than the aqueous acidic solutions.

In order for the partly condensed amine/formaldehyde resin to become insoluble in dilute acidic solutions and organic solvents, it is only necessary to expose it in the dry state to ordinary temperature, e. g., about 20° C. The insolubilization or curing proceeds, however, faster at elevated temperature, e. g., between 80 and 150° C., the preferred range being 90 to 125° C. Insolubilization is thus achieved within a short time, a period of between 5 and 30 minutes' heating being generally sufficient. In some cases curing is achieved within the time required to dry films of the condensation products of substrates, e. g., fabrics, having the condensation products deposited thereon. Higher temperatures, e. g., up to 200° C. may be used in certain cases, although care should of course be taken to prevent degradation of heat-sensitive resin supports such as paper or textiles.

For purposes of illustration, there is given below a typical preparation of a polymeric amine from a butadiene/acrylonitrile copolymer.

A butadiene/acrylonitrile copolymer containing 69% butadiene and 31% acrylonitrile, having an iodine number of 297 and a molecular weight of 1790 was was hydrogenated as follows: A solution of 40 parts of the polymer in 160 parts of dioxane, with 4 parts of 10% palladium-on-charcoal, 12 parts of 35% nickel-on-kieselguhr and 40 parts of anhydrous ammonia was hydrogenated 4 hours at 110° C. under 450 atmospheres total pressure, then 12 hours at 250° C. under 890-975 atmospheres total pressure. There was obtained 29 parts of a light colored, somewhat rubbery polymeric amine which was soluble in 5% acetic acid. It contained 4.32% of primary amino nitrogen and had a neutralization equivalent of 334.

As already stated, the polymeric amines to be combined with formaldehyde in accordance with this invention are derived by hydrogenation from copolymers of 1,3-butadiene and acrylonitrile or methacrylonitrile in which the butadiene content is between about 67% and about 84%. These limits are considered critical since copolymers showing an appreciable deviation from this range lead in general to polyamines which are not soluble in dilute acid. The most generally useful starting copolymers are the butadiene/acrylonitrile copolymers having between 73% and 81% of butadiene by weight, i. e., a butadiene/acrylonitrile mole ratio between about 2.6:1 and 4.2:1.

The hydrogenation of these polymers is preferably carried out catalytically in a substantially anhydrous liquid phase, and preferably in the presence of ammonia to repress the formation of secondary amines. The catalyst may be any of the metals known to promote hydrogenation of nitriles, e. g., platium, ruthenium, nickel, alloy-skeleton cobalt, copper chromite, nickel chromite and the like. The hydrogenation may be carried out in two steps, whereby the carbon-to-carbon double bonds are first reduced, then the carbon-to-nitrogen triple bonds, or in a single step, if necessary with a combination of catalysts. The hydrogenation temperature may be as low as 100° C. and as high as 350° C., a generally useful range being 150–275° C., and a hydrogen pressure between 1,000 and 30,000 lbs./sq. in. is generally used. Any suitable inert solvent may be used, such as tetrahydronaphthalene, decahydronaphthalene, benzene, toluene, the xylenes, cyclohexane, tetrahydrofuran, di-n-butyl ether, tetramethylene cyclic sulfone and the like. While catalytic hydrogenation is the preferred procedure, the butadiene/nitrile copolymers may also be hydrogenated by noncatalytic methods, e. g., by treatment with an alkali metal such as sodium or potassium and a low molecular weight aliphatic alcohol such as methanol, ethanol, butanol and the like.

The examples which follow, in which parts are by weight, illustrate various compositions comprising the polymeric amine/formaldehyde condensation products of this invention, together with some of the applications to which these products may be put.

*Example I*

To an aqueous solution containing 5% by weight of acetic acid and 5% by weight of the polymeric amine containing 4.32% of primary amino nitrogen whose preparation is described above was added 1% of formaldehyde as 37% aqueous solution. A wool flannel fabric weighing about 6 oz./sq. yard was thoroughly impregnated with this solution, then passed between rubber squeeze rolls set so as to give a wet weight about three times that of the original dry fabric. The fabric was then dried in a forced draft oven at 120° C. for 15 minutes. The treated fabric, containing about 10% by eight of polymeric amine/formaldehyde condensation product, was then well rinsed in a synthetic detergent solution containing about 0.5% of ammonia to neutralize the residual acetic acid. After again drying, the fabric had good hand and good color and possessed outstanding resistance to shrinkage. This was shown by the fact that, after being subjected to a vigorous laundry washing test, the treated fabric showed a total area shrinkage of only 3.5% based on the initial area. This shrinkage included the so-called "relaxation shrinkage," which is caused by a release of the stretched condition of wool fibers resulting from the fabric manufacture and usually amounts to 8–12% of the area. It is thus much less important than the milling shrinkage which results from subjecting wool to laundering treatments.

In comparison, an untreated control simply rinsed in the detergent solution and air-dried showed an area shrinkage of 9%. When the control was subjected to the same laundry washing test as used for the treated fabric, it showed a total area shrinkage of about 70%.

The presence of formaldehyde in the impregnating mixture is essential, as shown by the fact that when a control treatment was carried out without the formaldehyde, the wool after an identical laundry test showed a total area shrinkage of about 60%.

Example II

A butadiene/acrylonitrile copolymer containing 76.7% of butadiene by weight and having molecular weight of 2120 was hydrogenated to a polymeric amine having 5.52% of primary amino nitrogen, an iodine number of 55.1 and a neutralization equivalent of 265.

This polyamine was dissolved in the amount of 5% by weight in water containing 2% of acetic acid and to this solvent was added sufficient 37% aqueous formaldehyde to give a concentration in the solution of 1% of formaldehyde. Wool flannel weighing about 6 oz./sq. yard was impregnated with the solution of the amine/formaldehyde partial condensation product and squeezed through rollers until the wet weight was three times the initial weight, thus giving a loading of about 10%, based on the initial fabric weight, of the amine/formaldehyde partial condensation product. The fabric was dried at 100° C. for 15 minutes, rinsed in a solution containing 0.1% of a synthetic detergent and again dried. It had a soft, pliable hand and showed no appreciable discoloration. After a vigorous laundry washing test the fabric had lost only 2% in total area, whereas an untreated control subjected to the same laundry treatment showed an area shrinkage of 60%.

In comparison, the same wool flannel treated with a melamine-formaldehyde resin so as to give 20% polymer loading, dried at 100° C. for 10 minutes, cured at 150° C. for 5 minutes and subjected to the same laundry washing test showed an area shrinkage of about 20%.

Example III

A butadiene/acrylonitrile copolymer containing 22.4% by weight of acrylonitrile was hydrogenated to a polymeric amine containing 5.6% total nitrogen and 4% primary amino nitrogen.

A 2.9 part sample of this polyamine was warmed to about 90° C. with 50 parts of water containing 3 parts of glacial acetic acid. Practically all of the polymer dissolved. After filtering off the very small insoluble residue, the solution was cooled and used to impregnate wool to a loading of about 10% of polyamine after drying. The impregnated fabric, after air-drying for about one-half hour, was exposed to the vapors of a 5% aqueous formaldehyde solution for about one hour, then baked at 100° C. for 20 minutes over paper wet with the formaldehyde solution. The resulting treated wool had good hand and color. After a vigorous laundry test it showed only 5% area shrinkage.

Example IV

A butadiene/acrylonitrile copolymer containing 80.3% of butadiene by weight was hydrogenated to a polymeric amine containing 4.93% of primary amino nitrogen, having an iodine number of 50.2 and a neutralization equivalent of 344.

Sixty parts of a 20% solution of this polymeric amine in 2% acetic acid was ground for 15 hours with 12 parts of titanium dioxide. To the mix was added 2 parts of 37% aqueous formaldehyde and this pigment mixture was painted over glass plates and baked for 10 minutes at 150° C. There was obtained a uniform, glossy, non-tacky enamel coating which had very good adhesion. A similar composition, but without the formaldehyde, had poor adhesion to the glass.

Example V

A butadiene/acrylonitrile copolymer was hydrogenated to a polymeric amine containing 4.47% of primary amino nitrogen, having a molecular weight of 2180, an iodine number of 118 and a neutralization equivalent of 330.

Twelve parts of this resin was dissolved in dilute aqueous acetic acid to a total of 50 parts and the solution was ground with 12 parts of titanium dioxide. When 5 parts of this pigment mixture was treated with 0.05 part of 37% aqueous formaldehyde and the product painted on glass, a tack-free enamel coating was obtained on simple air-drying. This film had low gloss and good adhesion to glass. When larger amounts of formaldehyde were used, e. g., 0.15 part of 37% formaldehyde for 5 parts of pigment mix, the resin had a tendency to gel.

Example VI

A polymeric amine was prepared by sodium and alcohol reduction of a butadiene/acrylonitrile copolymer. It had a molecular weight of 990, an iodine number of 278 and it contained 3.78% of primary amino nitrogen.

A 15% solution of this polyamine in dilute aqueous acetic acid was treated with 37% aqueous formaldehyde in the ratio of 5 parts of the latter for 6 parts of the polyamine. This solution was applied to linoleum and allowed to dry in air. The resulting surface was tack-free, dull and had good water resistance. Similar results were obtained with another hydrogenated butadiene/acrylonitrile copolymer containing 5.97% of primary amino nitrogen and having a neutralization equivalent of 243, when used in the ratio of 6 parts of the polymeric amine to 1 part of 37% formaldehyde. When the formaldehyde was omitted the coating was tacky and had poor water resistance. In comparison with the results obtained with these amine/formaldehyde condensation products, a commercial floor coating compound when applied to linoleum showed some tackiness and only moderate water resistance.

Example VII

The polymeric amine mentioned in the first part of the preceding example was dissolved in the amount of 20% in dilute aqueous acetic acid and to this was added 2% of formaldehyde as 37% aqueous solution. The resulting solution was used to paint white pine board. About an hour later the wood so primed was painted with an alkyd resin paint. The drying of this paint coat was not adversely affected by the amine/formaldehyde condensation product priming coat. The painted panel had a uniform glossy appearance and the normal adhesion of the top coat to the wood was not lowered by the undercoat. A similar panel to which only the topcoat was applied was not glossy and a large proportion of the paint had been absorbed by the wood.

Example VIII

A butadiene/acrylonitrile copolymer containing 77.6% of butadiene was hydrogenated catalytically to a polymeric amine containing 4.09% of primary amino nitrogen and having a molecular weight of 1100.

Three parts of this polymeric amine was dissolved in 15 parts of water and 3 parts of acetic acid by heating to 70° C. To the solution was added 6 parts of molten paraffin wax and the mixture was stirred for 5 minutes, then diluted with 10 parts of water while stirring at 70° C. for 5 minutes. The dispersion was then cooled to room temperature while stirring was being continued and diluted with sufficient water to yield a bath containing about 4% of paraffin wax. This bath was used to pad undyed cotton fabric sateen so as to deposit about 4% by weight of paraffin wax thereon. The treated fabric after air-drying about one hour was exposed to formaldehyde vapors, thus forming an amine/formaldehyde condensation product in situ, then cured for 15 minutes at 120° C. It was then water-repellent, as shown by its spray rating of 90+ (see Year Book of the American Association of Textile Chemists and Colourists, 23, 240-4 (1946)). The fabrics were also tested for chlorine retention. Tests were made on treated samples as such, on samples after 3 and 6 launderings and on samples after 3 and 6 dry cleanings. In no case was there any marked chlorine retention. This test is based on the fact that, in commercial laundering, sodium hypochlorite is included with the detergent. If the fabric contains amide groups, e. g., because of prior treatment with a urea-formaldehyde resin, some chloroamide is formed. Subsequently, the chloroamide hydrolyzes and the hydrogen chloride liberated tenders the cellulosic fabric. The polyamine/formaldehyde condensation products of this invention showed no appreciable tendency to pick up chlorine, under the conditions of the test, before or after laundering or dry cleaning.

*Example IX*

A butadiene/methacrylonitrile copolymer containing 80% by weight of butadiene was catalytically hydrogenated to a polymeric amine containing 5.19% of primary amino nitrogen, having a molecular weight of 920, a neutralization equivlent of 369 and an iodine number of 3.

A 1% solution of this resin in dilute aqueous acetic acid was treated with 0.5% by weight of 37% aqueous formaldehyde. Blotter-type paper was impregnated with the solution so that it contained 1%, based on the dry weight, of amine/formaldehyde condensation product, and cured by heating at 105° C. for 20 minutes. This treatment greatly improved the dry and wet strength of the paper, as shown by the fact that its bursting strength in pounds per square inch was 54 (dry), 14 (wet 20 minutes), and 8 (wet 18 hours). The untreated paper has a dry bursting strength of 44 and a wet strength of zero. The same paper treated with 1% of a commercial urea-formaldehyde resin had a bursting strength of 40 (dry), 7.6 (wet 20 minutes) and 5.4 (wet 18 hours). The treatment with the amine/formaldehyde reaction product also made the paper water-resistant, as shown by the fact that a 15 sq. in. sheet exposed to water on one side for 5 minutes absorbed only 0.34 g. of water. In contrast, untreated paper, or paper treated with the urea-formaldehyde resin, absorbed 5.5 g. of water in this test.

*Example X*

A polymer was prepared from 4 moles of 1,3-butadiene and 1 mole of methacrylonitrile. It contained 6.37% nitrogen and had an iodine number of 271. Catalytic hydrogenation gave a polymeric primary amine of molecular weight 1140, containing 6.25% primary amino nitrogen, having an iodine number of 51 and a neutralization equivalent of 301.

Thirty parts of this polyamine was dissolved with warming in 61 parts of water and 6 parts of acetic acid. After cooling to room temperature, the solution was treated with 1.8 parts of 37% aqueous formaldehyde dissolved in 1.2 parts of water. There was thus obtained a solution containing 30% of polyamine solids. Its viscosity was about 1 poise at 25° C.

This solution was flowed on a glass plate as a thin film. After 5-10 minutes' drying in air at room temperature, the film was tack-free. Within 1 hour it had become insoluble in water, dilute acids and the common organic solvents. The film was colorless, transparent, had good toughness, moderately good hardness and excellent adhesion. Moreover, it was markedly water-repellent. Prolonged soaking in water did not seriously affect the adhesion.

Suitable substrates to which the compositions of this invention can be applied for the purposes previously mentioned, and for other purposes in which the substrate is advantageously coated or impregnated, are films, fibers and yarns from natural or synthetic materials, and fabrics therefrom. Specific examples are paper, cotton, wool, silk, regenerated cellulose, nylon, polyacrylonitrile, polythene, leather, hemp, sisal, protein fibers, gelatin, polyvinyl alcohol, hydrolyzed ethylene/vinyl acetate polymers, polyesters, cellulose acetate, etc. Other substrates include porous tile, wood, cork, and the like. The composition of this invention may also be applied to non-porous substrates such as glass, metals, ceramics, etc., and they can, for example, be used in such applications as wire coating and can coating. The condensation products may be used in various applications in mixtures with added materials such as dyes, pigments, fillers, oils, natural or synthetic resins and the like.

As many apparently widely different embodiments of this invention may be made without departing from the spirit and scope thereof, it is to be understood that this invention is not limited to the specific embodiments thereof except as defined in the appended claims.

I claim:

1. The resinous condensation product of formaldehyde and a polymeric amine of molecular weight from 500 to 100,000 which contains from 1.5% to 8.5% by weight nitrogen in the form of primary amino nitrogen, and which is the hydrogenation product of a copolymer of 1,3-butadiene with a substance selected from the group consisting of acrylonitrile and methacrylonitrile, said resinous condensation product containing at least 0.2 mole formaldehyde per primary amino group, said copolymer containing, on the basis by weight of combined 1,3-butadiene and said substance, from 67% to 84% of combined 1,3-butadiene.

2. The resinous condensation product defined in claim 1 in which said polymeric amine has a molecular weight of from 1000 to 10,000.

3. The resinous condensation product defined in claim 2 in which said resinous condensation product contains from 0.2 to one mole of formaldehyde per primary amino group and in which said polymeric amine contains from 3% to 6% by weight of nitrogen in the form of primary amino nitrogen.

MARTIN E. CUPERY.

REFERENCES CITED

The following references are of record in the file of this patent:

UNITED STATES PATENTS

| Number | Name | Date |
| --- | --- | --- |
| 2,456,428 | Parker | Dec. 14, 1948 |

Certificate of Correction

Patent No. 2,526,639                                                  October 24, 1950

MARTIN E. CUPERY

It is hereby certified that error appears in the printed specification of the above numbered patent requiring correction as follows:

Column 3, line 1, after "$CH_2O$" insert a closing parenthesis; line 18, strike out "a" before "acyclic"; line 35, for the words "products of" read *products or*; line 48, strike out "was", second occurrence; column 4, line 5, for "platium" read *platinum*; line 48, for "eight" read *weight*; column 5, line 6, after "having" insert *a*; line 13, for "solvent" read *solution*; column 7, line 8, for "air-dying" read *air-drying*; line 38, for "equivlent" read *equivalent*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*